United States Patent
Schmidt et al.

[15] 3,695,167
[45] Oct. 3, 1972

[54] FILTER FOR FILTERING COFFEE

[72] Inventors: Ernest G. F. H. Schmidt, Bremen; Bernhard Walkowsky, Maximilian; Wilfried Christoph Wilhelm Grote, Hannover, all of Germany; Matthias Janssen, decreased, late of Hannover-Kleefeld, Germany by Elizabeth Charlotte Janssen, executrix

[73] Assignee: said Schmidt, said Walkowsky and said Grote assors. to Joh. Jacobs and Co., Bremen, Germany

[22] Filed: Jan. 28, 1970

[21] Appl. No.: 6,492

[30] Foreign Application Priority Data

Jan. 28, 1969 Germany..........P 19 03 949.7

[52] U.S. Cl. ......................99/306, 99/77.1, 220/62, 229/41 B
[51] Int. Cl. .............................................A47j 31/00
[58] Field of Search........99/306, 323, 300, 295, 298, 99/77.1; 220/62; 229/41 B

[56] References Cited

UNITED STATES PATENTS

| | | |
|---|---|---|
| 2,822,273 | 2/1958 | Anderson....................99/77.1 |
| 3,185,372 | 5/1965 | Ferraro.......................99/77.1 |
| 3,159,096 | 12/1964 | Tocker.......................99/77.1 |
| 3,279,926 | 10/1966 | Batres........................99/77.1 |

*Primary Examiner*—Robert W. Jenkins
*Attorney*—Sughrue, Rothwell, Mion, Zinn & Macpeak

[57] ABSTRACT

A coffee filter having a square bottom sealed to four upright sides to form an open topped canister. The bottom and sides are scored by cooperating fold lines whereby the filter may be collapsed to a flat shape. The bottom has one or more perforations and is covered by a sheet of filter paper on the inside.

14 Claims, 7 Drawing Figures

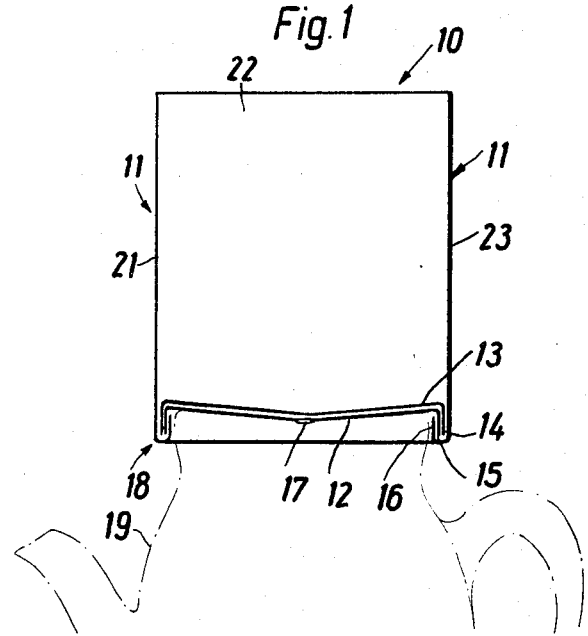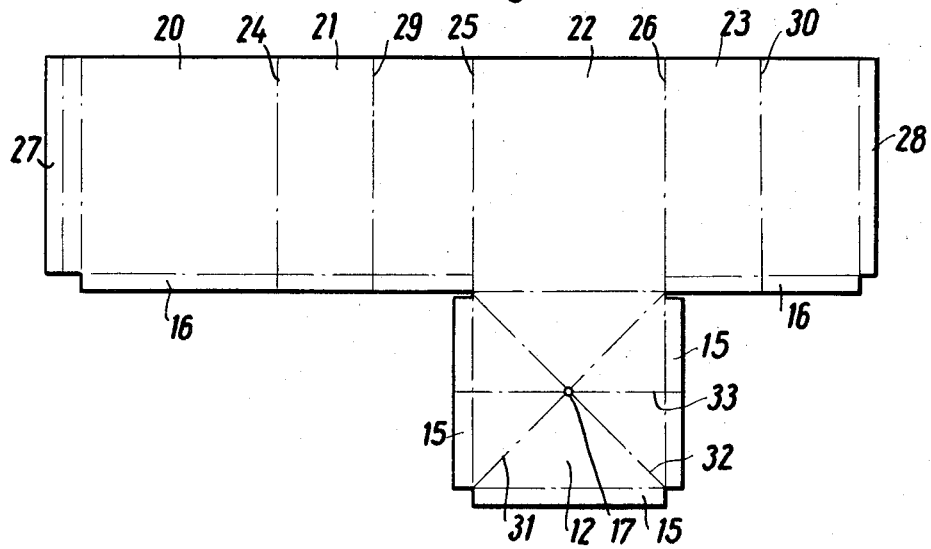

PATENTED OCT 3 1972  3,695,167
SHEET 2 OF 2
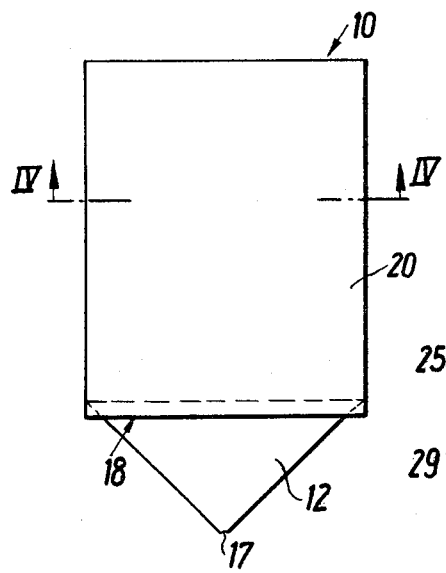
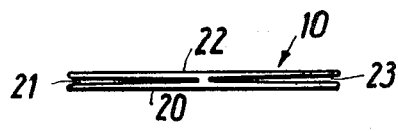
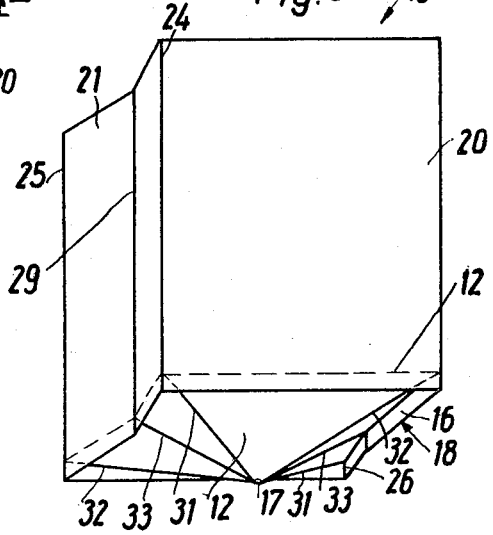
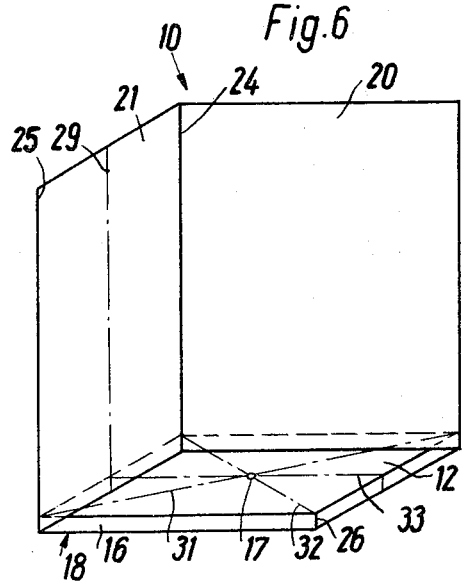
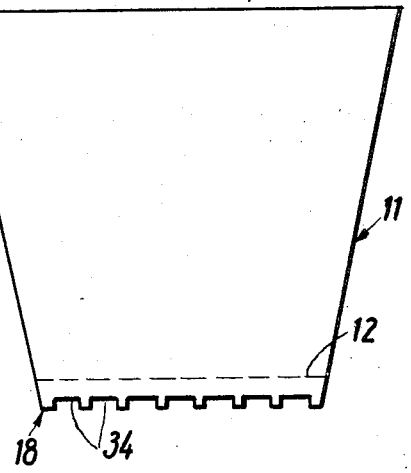

FILTER FOR FILTERING COFFEE

This invention relates to a liquid filter particularly adapted to making coffee, comprising a filter top which is disposed on a receptacle, such as a coffeepot, cup or the like.

When making coffee, it is conventional practice to filter the liquid poured over the coffee. The filters usually used in the home for this purpose consist of a non-deformable funnel-shaped filter top made from china or synthetic plastics. A filter paper in the form of a bag adapted to the shape of the filter top is fitted in the latter. The ground roast coffee is placed in this filter bag and hot water is poured on it.

The filter according to the invention is characterized in that the filter top, which consists of a foldable material, has scorings or fold lines enabling it to be collapsed into the flat state, and can be unfolded to a stable three-dimensional shape for use. The invention is based on the idea of providing a filter for use just once instead of the conventional filters having a rigid filter top which is used repeatedly.

Further details will be explained hereinafter with reference to exemplified embodiments of the invention illustrated in the drawings wherein:

FIG. 1 is a vertical section of a filter according to the invention.

FIG. 2 shows an unfolded blank for the production of a filter top.

FIG. 3 is a filter according to the invention in the collapsed state.

FIG. 4 is a section on the line IV—IV in FIG. 3 through the collapsed filter.

FIG. 5 is a perspective view from below showing the filter according to the invention during an intermediate stage of unfolding.

FIG. 6 is a perspective view of the filter from below in the unfolded state.

FIG. 7 is a diagrammatic side elevation of another embodiment of a filter.

The filters according to the invention are disposable filters, i.e., they are thrown away after being used just once. As a result, they are of very simple construction. They are also collapsible so as to occupy very little space before they are used.

The filters according to the invention consist of a filter top 10, which is open at the top and which when unfolded has a square or rectangular cross-section. In the embodiments illustrated, the filter top 10 comprises a side part 11 and a base 12 connected thereto. The side part 11 and the base 12 consist of foldable material, e.g., a metal foil, cardboard, paper or the like, which is rendered non-deformable and water-impermeable by coating with a sealable synthetic plastic. The synthetic plastic coating is provided at least on the inside of the side part 11 and of the base 12. In the unfolded state (FIG. 6), the filter is stable as a result of the construction adopted and the property of the foil or sheet material used.

The inside of the base 12 of the filter top 10 is provided with a filter paper 13. The latter extends preferably over the entire surface of the base 12 and its edge 14 together with an edge 15 of the base 12 is connected to the side part 11. In the exemplified embodiment shown in FIG. 1, the connection is made by a folded-over portion 16, which engages the edges 14 and 15 of the filter paper 13 and of the base 12 and secures the same by virtue of the properties of the foil or sheet material used. In these conditions there is no need for any additional retaining means.

Alternatively, the connection can advantageously be made by interconnecting the bottom edges of the base 12 and of the side part 11 by sealing (thermal welding). The filter paper is secured by the provision of recesses or apertures in its edge 14.

The base 12 is preferably slightly funnel-shaped so as to form a central depression in the region of which one or more apertures 17 are provided for the passage of the liquid. The filter paper 13 is so dimensioned that when the filter is in the unfolded state the filter paper fits into the funnel-shaped depression in the base 12. Said depression may, if required, be much deeper than shown in FIG. 1.

The folded-over portion 16 at the bottom end of the side part 11 forms a rim 18 on the filter top and when the filter is used said rim engages around the top edge of a vessel 19, e.g., a coffee pot, a cup or the like, thus increasing stability to prevent the filter from being unintentionally pushed aside.

A filter top 10 according to the invention may advantageously be made from a blank of the kind shown in the unfolded state in FIG. 2. The side part 11 consists of four side walls 20, 21, 22 and 23, between which scorings or fold lines 24, 25 and 26 are provided. These fold lines 24–26 also form the corners of the unfolded filter top 10. Tabs 27 and 28 are provided at the free edges of the side walls 20 and 23 and provide a positive connection between the said side walls 20 and 23 when the tabs 27 and 28 are folded over. The connection is substantially the same as at the folded over portion 16 at the bottom of the filter top 10.

A filter according to the invention is produced from the blank shown in FIG. 2 simply by folding operations and in the unfolded state the filter has, for example, the shape shown in a perspective view from below in FIG. 6. The initial shape, i.e., the collapsed flat shape, is shown in side view in FIG. 3. In this embodiment, the filter is collapsed transversely, the base 12 projecting downwardly from the side part 11. This is rendered possible by a relatively small number of simple fold lines. The fold lines 29 and 30 provided centrally and vertically in the region of the side walls 21 and 23 enable the side part 11 to be collapsed transversely, the side walls 21 and 23 being folded inwardly. The result is a relatively flat cross-section (FIG. 4) which can be unfolded very easily simply by pulling apart the side walls 20 and 22.

Similar fold lines are provided in the region of the base 12, namely two intersecting fold lines 31 and 32 extending diagonally between the corner points, and another transverse central fold line 33 which, when the filter is in the assembled state, forms an extension of the fold lines 29 and 30. The fold lines 31, 32 and 33 enable the base to be collapsed by inward folding of the triangular regions of the base 12 which are divided by the fold line 33.

FIG. 7 shows a modification of the filter according to the invention in which the side part 11 tapers in the downward direction so as to form a truncated pyramid. The rim 18 formed at the bottom end is serrated by means of incisions 34 to improve the fit of the filter on the vessel 19.

What is claimed is:

1. A collapsible liquid filter adapted when opened to be placed on the top of an open vessel for use in making coffee comprising:
   a side wall section having four side walls foldable along their connecting edges with upright fold lines in the middle of two opposite side walls, and
   a square base member secured to the side wall section having two intersecting fold lines extending diagonally through the corners and a central fold line parallel to two opposite sides of the base member and lying midway therebetween, the upright fold lines and the central fold line folding inwardly when the filter is in a collapsed position.

2. A liquid filter as defined in claim 1 wherein the filter is made of metal foil.

3. A liquid filter as defined in claim 1 wherein the filter is coated on at least one side with a sealable synthetic plastic material.

4. A liquid filter as defined in claim 1 wherein the base member is downwardly depressed at its center in the open position to form a funnel, and further comprising at least one aperture in the base member in its central region.

5. A liquid filter as defined in claim 1 wherein the side walls taper downwards to form a truncated pyramid side wall section.

6. A liquid filter as defined in claim 1 wherein the lower edge of the side wall section is folded inwardly and upwardly to form a downwardly projecting lower rim, and the outer edges of the base member and filter paper are folded downwardly inside of the upwardly folded lower edge of the side wall section.

7. A liquid filter as defined in claim 6 wherein the filter top is coated on at least one side with a sealable synthetic plastic material, and the base member is secured to the bottom edges of the sidewall section by sealing the coating.

8. A liquid filter as defined in claim 1, further comprising a filter paper covering the inner bottom region of the opened filter and secured thereto around its edges, the side wall having serrated edges for engaging the top of the open vessel.

9. A collapsible liquid filter made of foldable material for filtering liquids and capable of being stored in a flat state comprising:
   side wall members and a bottom member connected to the side wall members, at least two side wall members opposite each other have fold lines, the bottom member having fold lines which run diagonally through the corners and intersect each other and at least one other fold line which extends from one fold line in one side wall member through the intersection point of the diagonal fold lines to the fold line on the opposite side wall member.

10. A collapsible liquid filter as in claim 9, where the side wall fold line and its adjacent bottom member fold line fold inward in a collapsed position.

11. A collapsible liquid filter as in claim 10, where the bottom member in an open position has a pyramid shape with an opening at its apex.

12. A collapsible liquid filter as in claim 10, where the side walls have at their bottom edges, individual projections adapted to engage a rim of a vessel for holding the filtered liquid.

13. A blank for forming a collapsible liquid filter container to be positioned on the top of an open vessel for receiving the filtered liquid, the blank comprising:
   a first rectangular member having parallel fold lines dividing the member into four equal panels, alternate panels have parallel central fold lines equally dividing their respective panels, and
   a second substantially square member connected along a fold line with a panel not having a center fold line, the square member having a central aperture with a pair of diagonal lines intersecting the aperture from each corner and a central fold intersecting the aperture and extending parallel to the axis of the rectangular member whereby the lower edges of each panel adjacent the side of the square member can be attached to the periphery of the square member to form the collapsible filter container.

14. A blank as in claim 13, including folding edge portions connected to three of the panels of the first rectangular member and three of the sides of the square member.

* * * * *